United States Patent
Kober et al.

[11] Patent Number: 5,793,150
[45] Date of Patent: Aug. 11, 1998

[54] FLAT SEAL

[75] Inventors: Horst Kober, Weinheim; Karl-Heinz Spiess, Birkenau; Steffen Kosack, Hassloch, all of Germany

[73] Assignee: Firma Carl Freudenberg, Weinheim, Germany

[21] Appl. No.: 499,627

[22] Filed: Jul. 7, 1995

[30] Foreign Application Priority Data

Jul. 7, 1994 [DE] Germany ............ 44 23 893.2

[51] Int. Cl.⁶ .................................... H01L 41/08
[52] U.S. Cl. .................... 310/338; 310/800; 310/340
[58] Field of Search .................. 310/338–340, 310/800

[56] References Cited

U.S. PATENT DOCUMENTS

| | | | |
|---|---|---|---|
| 3,855,507 | 12/1974 | Hoyler | 317/258 |
| 4,292,106 | 9/1981 | Herschdorfer et al. | 156/243 |
| 4,643,508 | 2/1987 | Schaller | 339/147 R |
| 4,814,943 | 3/1989 | Okuaki | 361/400 |
| 4,846,698 | 7/1989 | Staiger et al. | 439/55 |
| 4,871,595 | 10/1989 | Lusignea | 428/1 |
| 5,008,360 | 4/1991 | Bard et al. | 528/25 |
| 5,126,192 | 6/1992 | Chellis et al. | 428/323 |
| 5,182,632 | 1/1993 | Bechtel et al. | 257/713 |
| 5,557,843 | 9/1996 | McKenney et al. | 29/851 |

FOREIGN PATENT DOCUMENTS 41 01 871  7/1992  Germany.

Primary Examiner—Mark O. Budd
Attorney, Agent, or Firm—Kenyon & Kenyon

[57] ABSTRACT

A flat seal having a first and a second sealing surface made of polymer material is disclosed. Each of the polymer sealing surfaces is made of a formed-fabric-reinforced cover layer. At least two of these cover layers together provide a flexible, electrical printed-circuit board, whose material completely surrounds electrical interconnect traces in the sealing areas. The interconnect traces are provided with connecting conductors, which are brought with terminal pads out of the printed-circuit board. The material of the cover layers has an electrical resistance of at least $10^8$ ohm and provides insulation for the interconnect traces.

16 Claims, 7 Drawing Sheets

FLAT SEAL

BACKGROUND OF THE INVENTION

The invention relates generally to a flat seal having polymer sealing surfaces. Such a flat seal is disclosed in German Patent No. 41 01 871 A1, which teaches a stationary pressure-distribution and pressure-characteristic sensor. In that patent, a flat seal is comprised of two seal halves, in which a sensor film comprised of a flexible, piezoelectric polymer layer is arranged between two electrically insulating protective films. The size and the number of the active sensor fields on the sensor film are defined by conductor surfaces, which are vapor-deposited on both sides and comprise outgoing interconnect traces. Placed on the ends of these vapor-deposited interconnect traces are copper-coated polyester tape strips, which establish the contact through touching and lead outside of the seal into a miniature coaxial plug connector. Manufacturing such a seal requires considerable outlay and is difficult, since the various layers and conductor strips have to be sealed and pressed to ensure accuracy of fit by using a resilient contact adhesive.

There remains a need for the further development of a flat seal of this general type that is easier to manufacture.

SUMMARY OF THE INVENTION

The present invention provides for a flat seal of the general type discussed above that is easier to manufacture. In this invention, two sealing surfaces made of two formed-fabric reinforced covering layers are employed. The elements collectively form a flexible, electrical printed-circuit board. The material of which it is made, impregnated formed fabric, completely surrounds electrical interconnect traces in the sealing areas. These interconnect traces are provided with connecting conductors which, along with terminal pads, are brought out of the printed-circuit board. This enables the more economical production of flat seals with integrated connections, the connecting conductors connecting the spaces to be sealed off from one another so as to allow signal conduction therebetween. Moreover, this design permits the connection of integrated sensors to the terminal pads in the sealing area of the flat seal.

The flat seal is constructed from several layers of formed fabric prepreg. In the instant invention, a prepreg is understood to be a bonded fiber fabric consolidated with a binding agent; thus it is a formed fabric that is impregnated with a polymer mixture. After the hand-drying drying process, this prepreg is not yet fully polymerized and is, therefore, capable of adherence or sealing. This characteristic makes it possible for the cover layers and the entire flat seal to be simply manufactured and results in considerable mechanical strength for the sealing material.

In the manufacture of the flat seal, the formed fabric webs are first saturated with a filled or unfilled polymer dispersion and dried, so that the polymer layer retains the capability of adhering or sealing. A copper metal foil is then laminated onto a prepreg web, preferably in a continuous lamination process. Conductor patterns are subsequently formed on this metal-coated laminate using known methods of circuit board manufacturing, so that the cover layer, which is also the dielectric material of the printed-circuit board, is covered with a nearly closed conductor surface. This design results in a very planar composite construction. During the process of laminating another prepreg web on to the conductor pattern, the polymer of the prepreg flows into the depressions between the interconnect traces and bonds the two parts to one another. As a result, the interconnect traces are connected with friction locking and/or with form locking to the cover layers, and the individual interconnect traces are electrically insulated from one another. The result is a flat seal with integrated connecting conductors.

For proper electrical performance, it is necessary for the material of the formed-fabric-reinforced cover layers to have an electrical resistance of at least $10^8$ ohms and to be formed as an insulation for the interconnect traces. The formed fabric, the fillers and the polymers are adapted to one another so as to allow the flat seal to reliably seal off the spaces to be sealed off from one another and the conductor layer to be insulated from metallic flanges with a largest possible dielectric resistance, over $10^8$ ohm.

In order to integrate a plurality of electrical functions into the flat seal, at least two printed-circuit boards can be used, whose interconnect traces are each provided with connecting conductors, the printed-circuit boards being isolated from one another by at least one electrically insulating formed fabric-reinforced intermediate layer. This enables the provision of, for example, an integrated pressure sensor and a leakage sensor in a single flat seal.

The cover layers and/or the intermediate layer preferably consist of an aramide-fiber formed fabric that is impregnated with a polymer mixture, and have a mass per unit area of 30 $g/m^2$ to 200 $g/m^2$, and preferably of between 50 $g/m^2$ to 100 $g/m^2$. The aramide fibers have exceptionally good mechanical properties, such as extremely high tenacity, a high modulus of elasticity, considerable dimensional stability, and a high temperature resistance, and are elastic. Flat seals reinforced in this manner are, therefore, very well suited for applications in high-pressure ranges of up to about 300 bar and high-temperature ranges of up to about 400° C. The polymers are used in the form of polymer dispersions or polymer solutions, the polymer being dispersed or dissolved in water or in organic solvents. During the drying process, the polymers should only prepolymerize to a small extent, so that the polymer can still flow in the prepreg during the lamination operation, both to bond the printed-circuit board situated above and/or below, and to completely fill in the cavities in the form of channels between the interconnect traces. As hardeners, acrylate mixtures or copolymerizates of acrylic-acid ester with polyurethanes and epoxide have proven to be especially suited. Silicone and silicone gum can likewise be used. The flat seal using a formed-fabric prepreg layer on the bottom and top side of the printed circuit board has a total thickness of about 0.2 mm when formed fabric having a mass per unit area of 50 $g/m^2$ is used. The total thickness of the flat seal can be easily adapted to the specific requirements of the particular application, in that either a formed fabric with a higher mass per unit area is used, or a plurality of prepreg layers are laminated over one another.

The printed-circuit boards can be arranged on mutually opposing sides of a reinforcement layer. The reinforcement layer can be made up of a metal core or of a core of polymer material. If the reinforcement layer consists of a metallic material, a reinforcement plate of aluminum or steel is preferably used.

In one preferred embodiment, the reinforcement layer itself is a rigid printed circuit board bearing interconnect traces. As sealing and insulation layers, at least one formed-fabric prepreg of the afore-mentioned type is then laminated on both sides.

Arranged in any case on the reinforcement layer is the printed circuit board that is enclosed between the first cover layer and the intermediate layer and, on the other hand, the second cover layer. In each case, the cover layers and the intermediate layer are comprised of a formed-fabric prepreg. The components are pressed together under pressure and heat, so that a flat seal is formed with a reinforcement layer, on which is situated on at least one side a printed circuit board that is integrated in the sealing material and which comprises a connecting conductor.

The reinforcement layer can be provided with at least one cut-out, the cut-out surrounding a sensor chip with clearance all around, and the printed circuit board being provided with connecting conductors, which engage with the sensor chip so as to allow signal conduction. In use, the cut-out is completely filled in with encapsulating material surrounding the sensor chip. Such a design advantageously permits semiconductor chips to be integrated, along with sensor elements and evaluation electronics, within the seal. In one embodiment, the thickness of the reinforcement layer is selected to be somewhat greater than the thickness of the sensor chip. The connecting conductors integrated in the flat seal form electrical terminal pads for the chip. The encapsulating material is provided as a mechanical protection for the chip.

To detect leakage out of the sealed space, the metallic flange surfaces that are to be sealed off, bordering on the cover layers, and the metal electrode between the cover layers, can form the plates of a double-plate capacitor. The double-plate capacitor formed as the result of insertion of the flat seal can be used as a leakage sensor. If the medium to be sealed off penetrates between the sealing surfaces, the dielectric material and the relative dielectric constant change. The resultant change in capacitance is then a measure of the integrity of the seal.

To minimize leakage capacitance, it is advantageous for the metal electrode to be surrounded on the peripheral side by an annular protective electrode. Since the permeability of a dielectric material changes in dependence upon temperature, it is advantageous to install a resistor element (e.g., in the form of a meandering conductor pattern), at the same time as the capacitor surface. From the interrelationship between the change in resistance of electrical conductors and the change in temperature, a temperature compensation signal can be extracted when the capacitance of the double capacitor is measured. The resistor element advantageously consists of the protective electrode.

In one embodiment of the invention, the connecting conductors are disposed to influence the metal electrodes of a piezoelectric sensor film with electrical contact occurring, when the seal is pressurized. For simple contact, it is necessary that both connections of the metal electrodes lie on one plane. For this purpose, the metal electrodes are interconnected with the help of a metallic plated through hole in the area of their terminal pads. In contrast to the designs of the prior art, the integration of the formed-fabric-reinforced cover layers as a printed circuit board obviates the need to use any special protective films and individual conductor films.

The previously described flat seal has integrated external and internal connecting conductors and can be designed, for example, as a pressure and/or leakage sensor.

BRIEF DESCRIPTION OF THE DRAWINGS

For a more complete understanding of this invention, reference should now be made to the embodiments illustrated in the accompanying drawings and described below. In the drawings.

DETAILED DESCRIPTION

Figure 1:
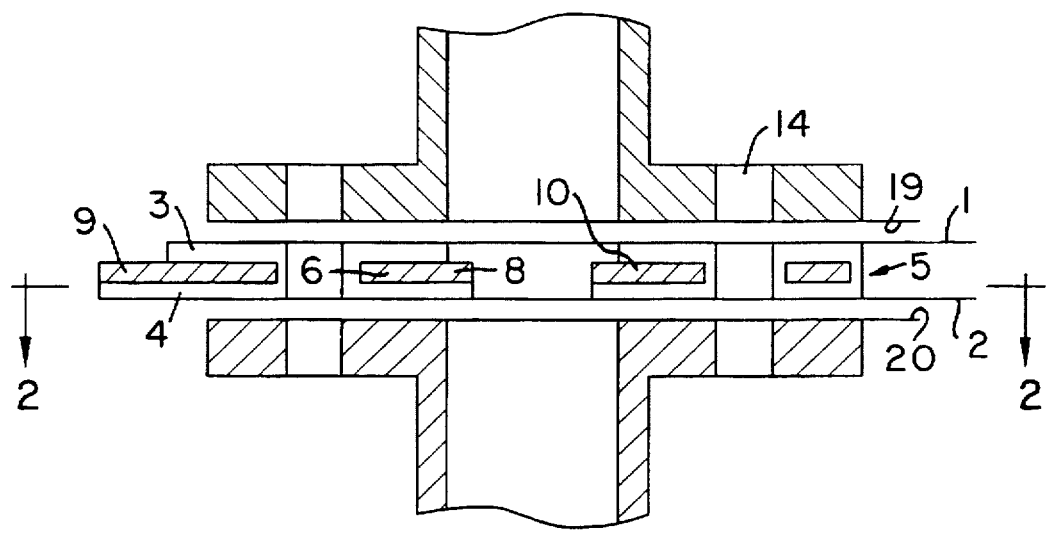
FIG. 1 is a longitudinal cross-sectional exploded view of a first embodiment of a flat seal constructed according to the principles of the invention.
Figure 2:
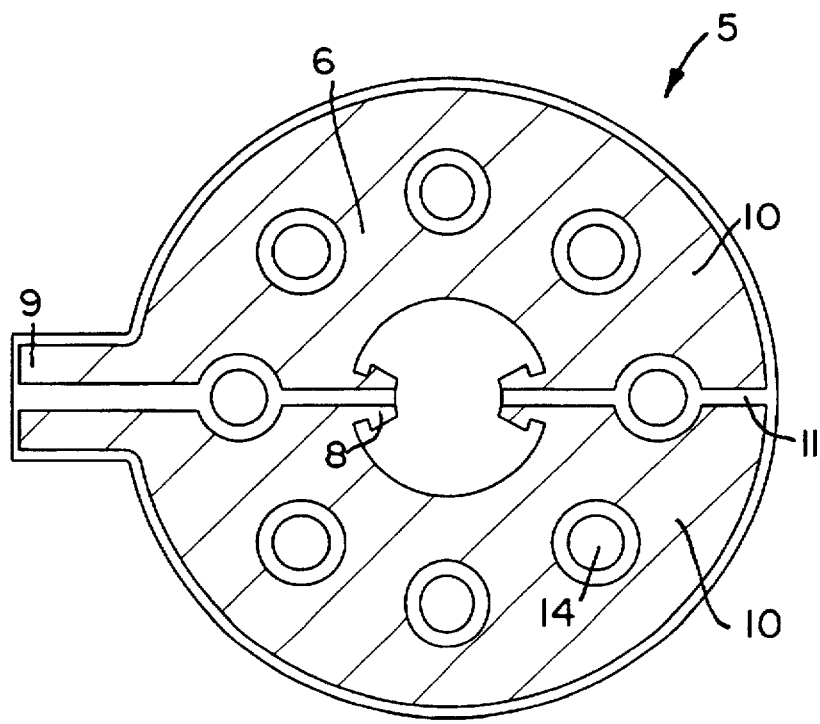
FIG. 2 shows a section of the seal taken along line A—A of FIG. 1.

FIGS. 1 through 11 show a number of sealing arrangements constructed according to principles of the invention, in which flange surfaces 19 and 20 are sealed off by a flat seal. The sealing surfaces 1 and 2 of the flat seal comprise a polymer material and are made, in each embodiment, of at least one formed-fabric-reinforced cover layer 3, 4. The cover layers 3 and 4 completely surround electrical interconnect traces 10 in the sealing area. The cover layers 3 and 4, along with the interconnect traces 10, form a flexible electrical printed-circuit board 5. The printed-circuit board 5 is provided with connecting conductors 6, which have internal and external terminal pads 8 and 9 that emerge out of the material of the electrically insulating cover layers 3 and 4.

FIG. 1 illustrates a sealing arrangement in a cross-sectional exploded view. The flange surfaces 19 and 20 that are to be sealed off in this example are made of metallic material and are each provided with fastening cut-outs 14, which permit them to be screw-coupled to one another. (A standard bolt and nut arrangement—not shown—can be used for this purpose.) Arranged between the flange surfaces 19 and 20 is a flat seal, formed as a flexible electrical printed circuit board 5, which has first and second sealing surfaces 1 and 2, respectively. The circuit board 5 is comprised of formed-fabric-reinforced cover layers 3 and 4. Arranged between the cover layers 3 and 4 are electrical interconnect traces 10, which are provided with connecting conductors 6 having internal and external terminal pads 8 and 9, respectively (see FIG. 2). The interconnect traces 10 can be formed from a copper foil and be insulated from one another by etched channels 11. The interconnect traces 10 and the cover layers 3 and 4 are laminated to one another, e.g., via the application of heat and pressure, so that they are affixed to one another in a fluid-tight manner. Prior to lamination, the cover layers 3 and 4 are a non-hardened formed-fabric prepreg. The polymer of the prepreg penetrates into the channels 11 between the interconnect traces 10 during lamination and fills them in completely. The material of the cover layers 3 and 4 has an electrical dielectric resistance of at least $10^8$ ohm.

Figure 3A:
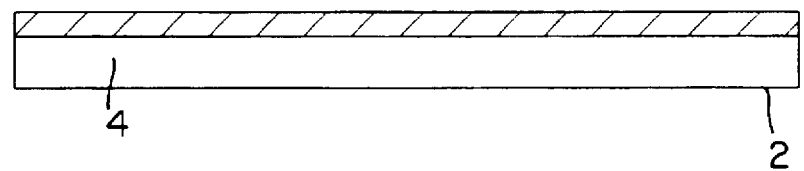
FIG. 3 illustrates the process steps by which the flat seal is built up.
Figure 3B:
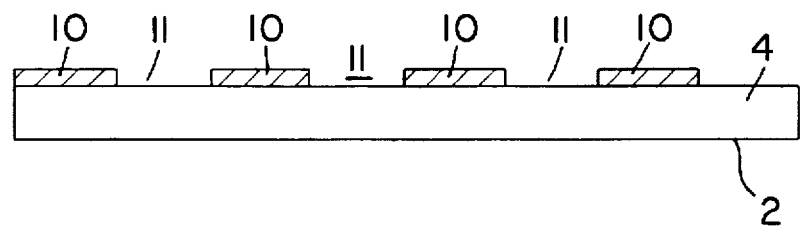
Figure 3C:
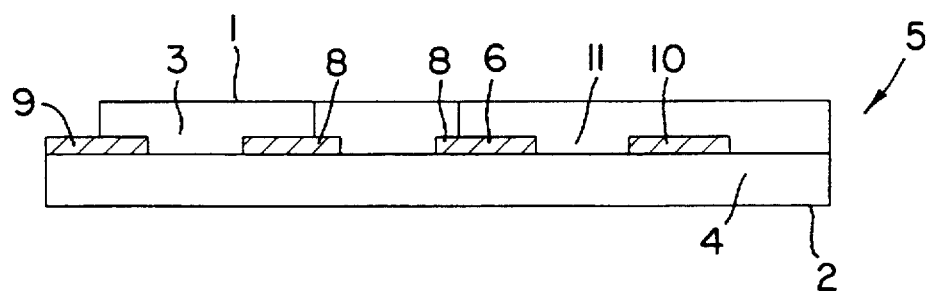
Figure 3D:
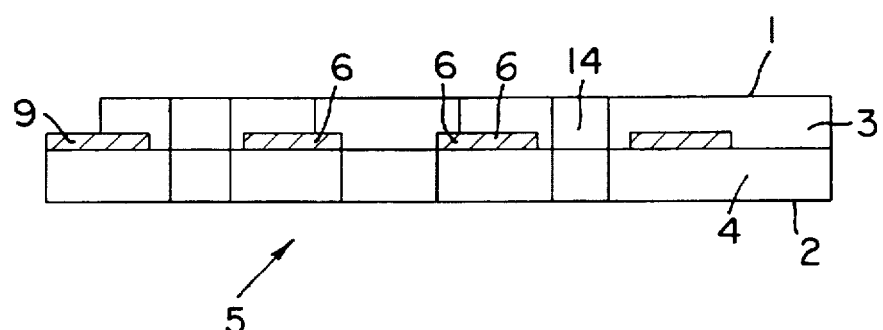

FIGS. 3a–3d show the build-up of the structure of a flat seal during the course of manufacture. FIG. 3a depicts the formed-fabric-reinforced second cover layer 4, which is laminated with a copper foil F. The interconnect traces 10 are subsequently etched into the copper foil F. The interconnect traces 10 are separated from one another by channels 11, as shown in FIG. 3b. After the interconnect traces 10 are formed, the first cover layer 3 is laminated with the composite, now comprising the etched copper foil and the second cover layer 4, as shown in FIG. 3c. Because the first cover layer 3 is formed as a prepreg, the polymer penetrates during lamination into the channels 11 between the interconnect traces 10, thereby insulating them from one another and sealing them off. The connecting conductor 6 that is discernable here is brought with an external terminal pad 9 out of the flat seal. As depicted by FIG. 3, fastening cut-outs 14, which penetrate the entire flat seal, are extended into and through the laminated flat seal.

Figure 4A:
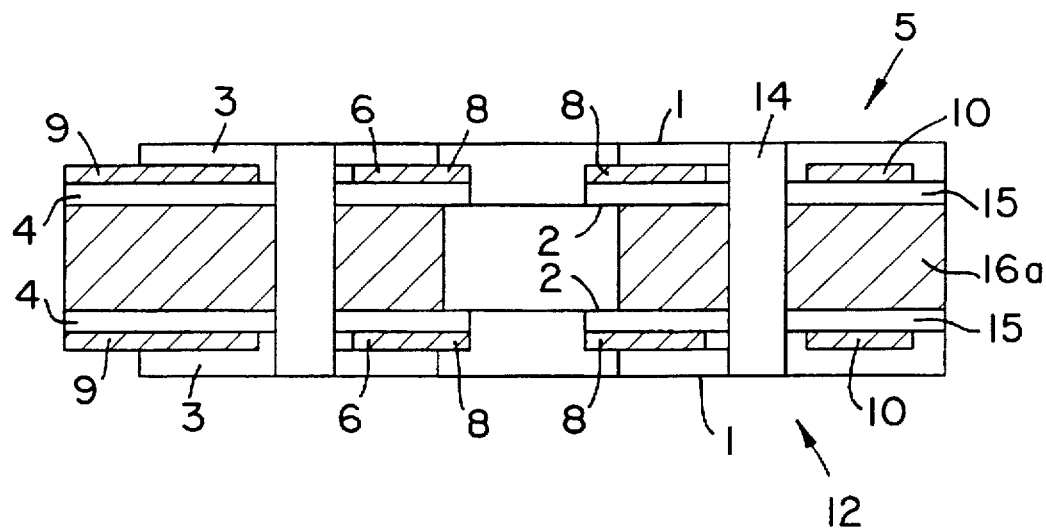
FIGS. 4a and 4b each show embodiments of a flat seal with a reinforcement layer in which cover layers with integrated connecting conductors are provided on both sides of the reinforcement layer.

FIG. 4a illustrates a flat seal having two printed-circuit boards 5 and 12, which are joined by a reinforcement layer 16a that is made of metallic material. The printed-circuit boards 5 and 12 each have a first and a second cover layer 3 and 4. Interconnect traces 10 are arranged between the cover layers 3 and 4, the interconnect traces 10 being sealingly surrounded by the cover layers 3 and 4. The cover layer 4 of each printed-circuit boards 5 and 12 facing the reinforcement insert 16a form an intermediate layer 15. The intermediate layers 15 are joined in a fluid-tight manner to the reinforcement layer 16a. The first and the second printed-circuit boards 5 and 12 are each provided with connecting conductors 6, with internal and external terminal pads 8 and 9 of the connecting conductors 6 protruding from the flat seal.

Figure 4B:
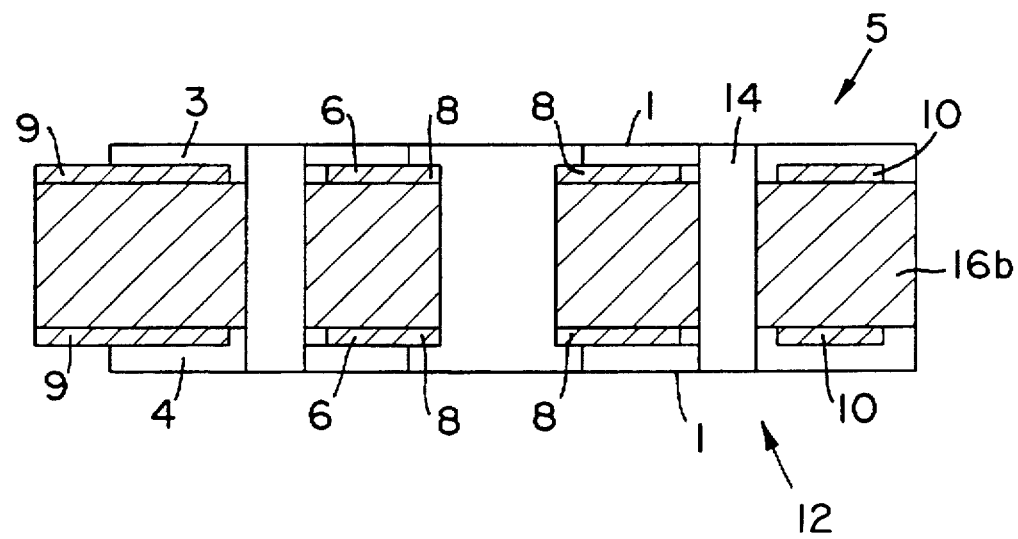

In the embodiment shown in FIG. 4b, the reinforcement insert 16b is designed as a rigid printed-circuit board comprising, for example, epoxy woven-glass fabric as a carrier for the connecting conductors 6 and the terminal pads 8, 9. The conductors are then covered on both sides, as in the case of the printed-circuit board 5, with formed-fabric prepreg. These prepregs, which in their hardened state serve as cover layer 3 for cooperation with the flanges as sealing and insulation layers.

Figure 5:
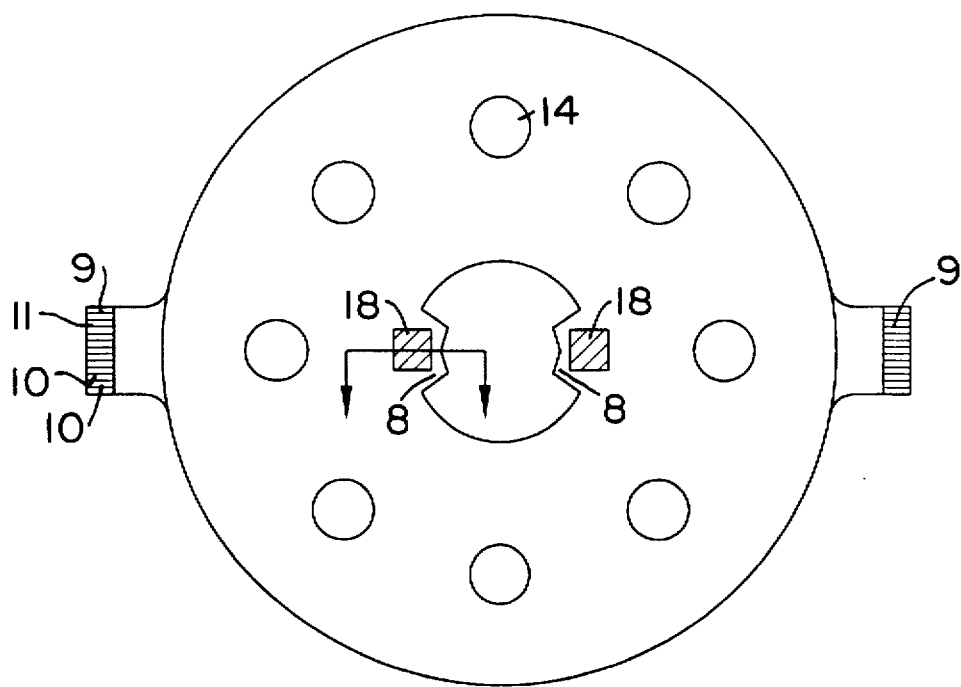
FIG. 5 illustrates a longitudinal section through the seal of FIG. 4 in the plane of the reinforcement layer, in which a chip is arranged within the seal.

FIG. 5 shows a sealing arrangement similar to the sealing arrangement of FIG. 4, but with the external terminal pads 9 being arranged in separate axial planes of the flat seal. At least one sensor 18 is mounted in each case of the first and second printed-circuit board 5 and 12.

Figure 6:
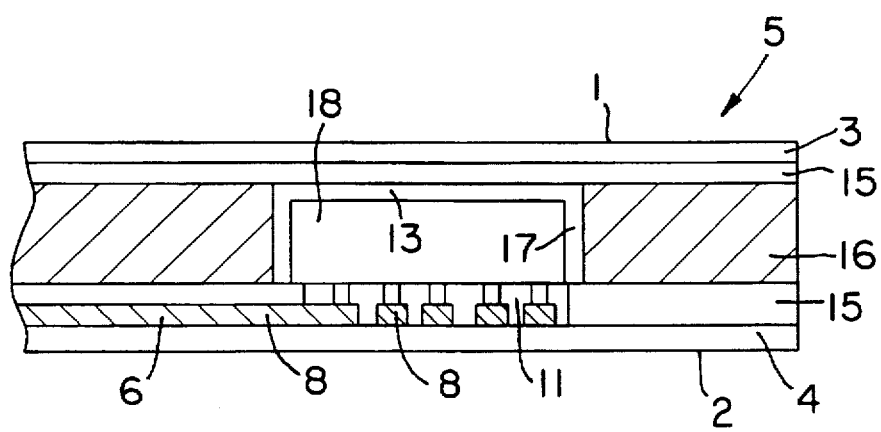
FIG. 6 illustrates a partial section through the component part of FIG. 5, depicting one possible arrangement of a chip.

FIG. 6 illustrates a cut-away portion of a flat seal, similar to the flat seal of FIG. 4. The reinforcement layer 16 is provided with a cut-out 17, in which a sensor chip 18 is arranged. The gap 7 between the sensor chip 18 and the cut-out 17, as well as the free space between the cover layers 3 and 4 in the sensor area, is filled with an encapsulating material 13. The interconnect traces 10 are provided with internal terminal pads 8; the connecting conductors 6 are separated from one another by channels 11. The internal terminal pads 8 are connected to the sensor chip 18.

Figure 7:
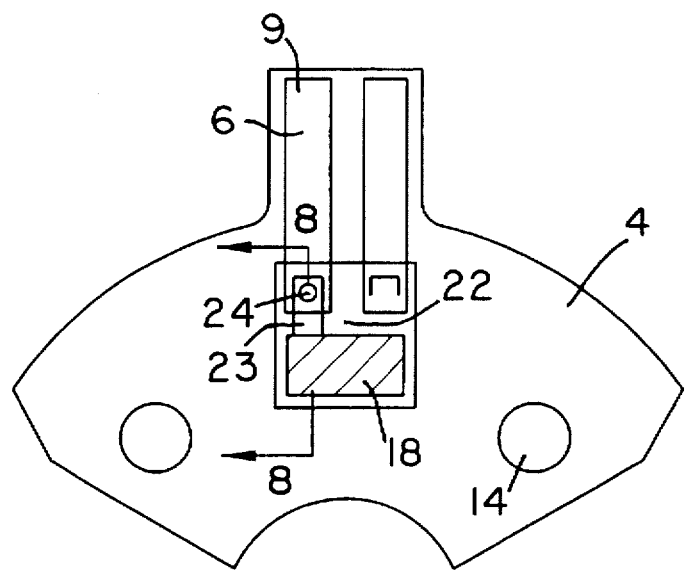
FIG. 7 shows a section through a flat seal, corresponding to FIG. 1, in which a piezoelectric film is integrated as a pressure sensor film on the plane of the connecting conductor.

FIG. 7 is a cut-away portion of a flat seal having a pressure sensor, the pressure sensor 18 being comprised of a piezoelectric sensor film 22, which is formed as a polymer ceramic film. The connections of the two electrodes are provided with a metallic plated through-hole 24 to provide a simple, electrically conductive connection.

Figure 8:
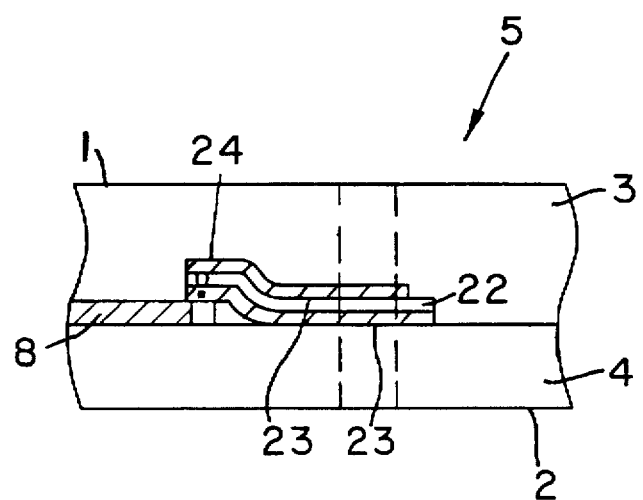
FIG. 8 depicts a partial section of FIG. 7, which further illustrates the contact between the sensor film and the connecting conductor.

FIG. 8 is a sectional view through the flat seal of FIG. 7. The metal electrodes 23 vapor-deposited on a polymer ceramic film 22 are connected to the internal terminal pad 8 of the connecting conductor 6 and are completely surrounded by the first and second cover layers 3 and 4. In operation reliable contact between the connecting conductors 6 and the metal electrodes 23 of the sensor film 22 is guaranteed by the contact pressure of the sealing connection. To achieve simple contact, both connections of the electrodes must lie on one plane (in this example, on the bottom side). For this purpose, the metal electrodes 23 are connected by way of a metal plated through-hole (or via) 24 to the terminal pad 8 situated on the bottom.

Figure 9:
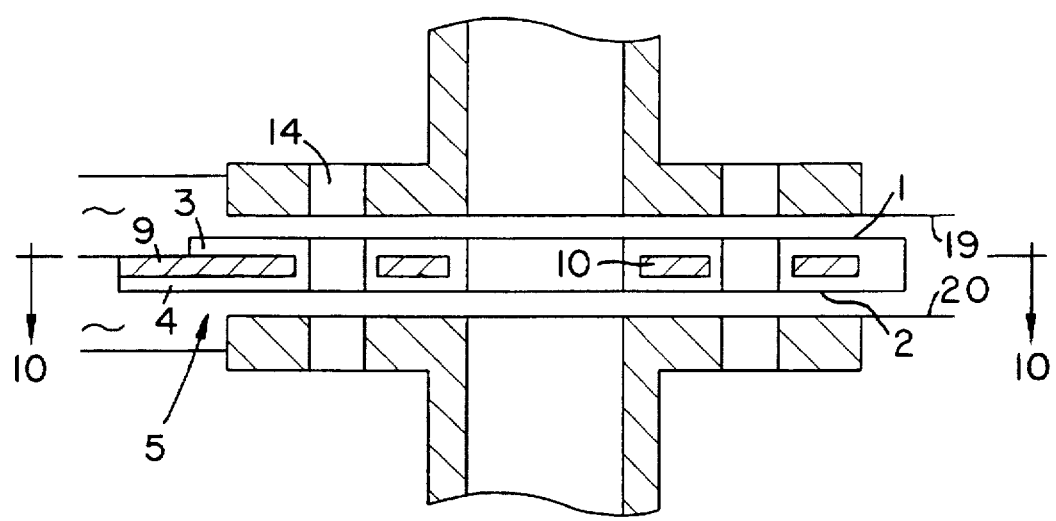
FIG. 9 illustrates a flat seal with a capacitor electrode, which, together with the flanges of the component parts to be sealed off, form a double capacitor.
Figure 10:
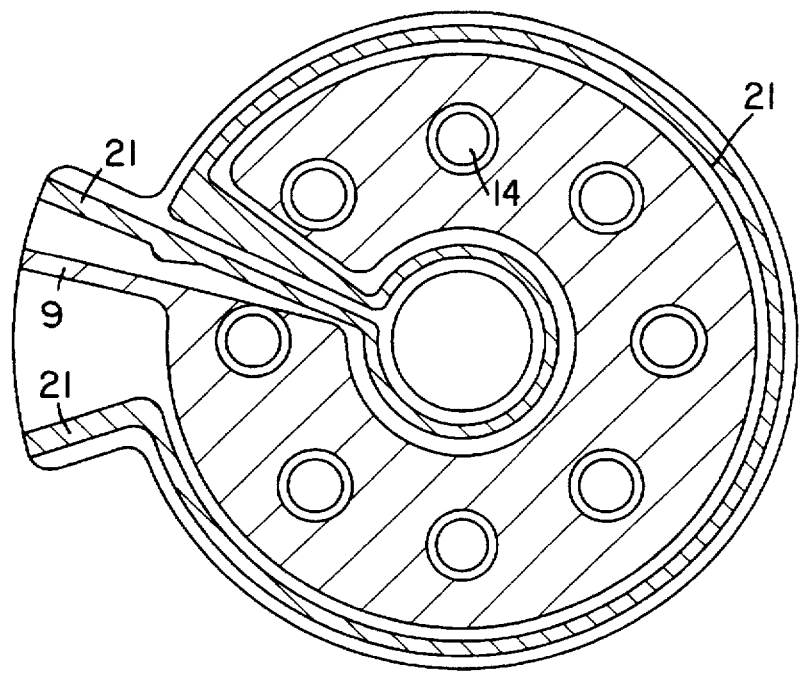
FIG. 10 depicts a view of another embodiment refinement of a flat seal in which the capacitor electrode is surrounded by a protective electrode.
Figure 11:
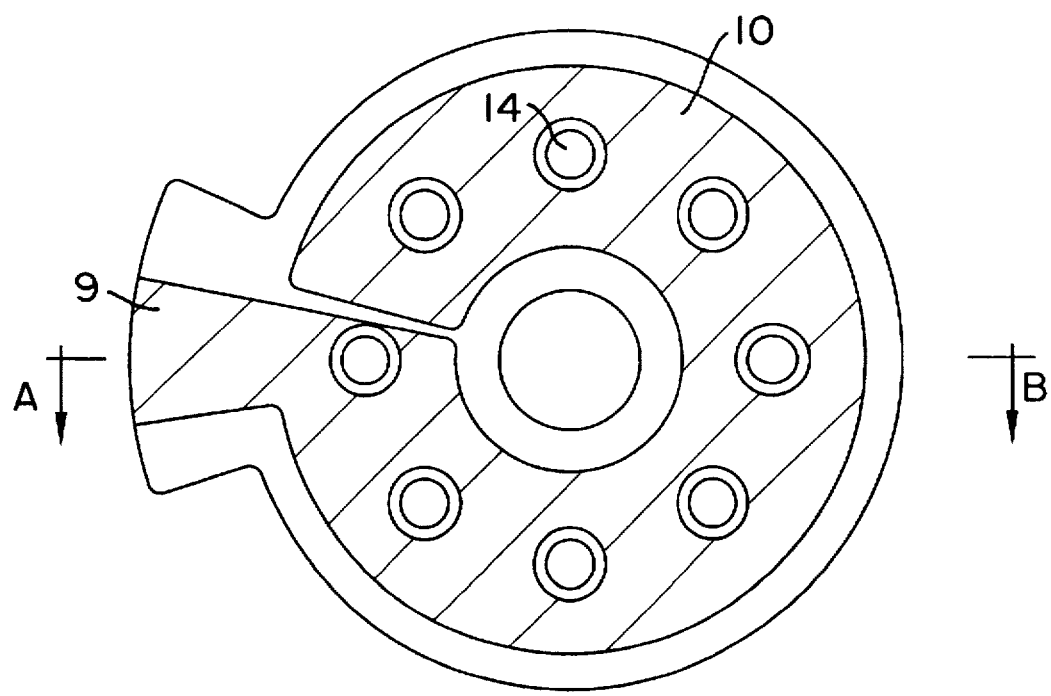
FIG. 11 shows the design of the circuit layer employed in the embodiment of FIG. 9.

FIGS. 9–11 depict a sealing arrangement that provides for a plate-type capacitor to function as a leakage sensor. Here, the metal flanges function as the plates of a capacitor. If the medium to be sealed off penetrates between either of the cover layers 3 and 4 and the metallic flange surfaces 19 or 20 that are to be sealed off, or penetrates into the cover layers 3, 4, then the dielectric constant and, thus, the capacitance of the double-plate capacitor will change. The change in capacitance is a measure of the leakage. To restrict the electrical stray field, a protective electrode 21 (see FIG. 10) in the form of a ring electrode is provided, the ring electrode being arranged around the metal electrode of the seal designed as a capacitor-type electrode. In general, the additional conductor represented by the electrode 21 can be utilized to a) limit the capacitor field;

b) screen the interference field; and c) provide a measurement of the temperature (the physical basis for this capacity being the variation of its electrical resistance with temperature).

What is claimed is:

1. A flat seal comprising:

a first cover layer providing a first polymer sealing surface;

a second polymer cover layer providing a second polymer sealing surface, each of said cover layers being formed of at least one formed-fabric-reinforced cover layer;

a series of electrical interconnect traces sealingly sandwiched between the first and second cover layers, so that the material of the cover layers completely surrounds the electrical interconnect traces, wherein the first cover layer, the second cover layer, and the interconnect traces collectively form a plurality of flexible printed circuit boards;

a reinforcement layer, at least two of the plurality of circuit boards being arranged on opposite sides of the reinforcement layer, and wherein the reinforcement layer is provided with at least one cut-out portion having walls, the walls of said cut-out surrounding a sensor chip with a clearance, said clearance being filled in with encapsulating material surrounding the sensor chip, and wherein the printed circuit board is provided with connecting conductors that engage the sensor chip so as to allow signal conduction; and connecting conductors that protrude via terminal pads out of the printed circuit board, wherein the cover layers have an electrical resistance of at least $10^8$ ohm and also serve to provide insulation for the interconnect traces.

2. The flat seal according to claim 1, wherein the interconnect traces are delimited by etched channels, and the channels are filled in by the material of the first and second cover layers.

3. The flat seal according to claim 1, wherein the interconnect traces and the cover layers are connected to each other via friction and/or form locking.

4. The flat seal according to claim 1, comprising at least two printed circuit boards, each having interconnect traces that are provided with connecting conductors, said printed-circuit boards being isolated from one another by at least one electrically insulating formed-fabric-reinforced intermediate layer.

5. The flat seal according to claim 2, comprising at least two printed circuit boards, each having interconnect traces that are provided with connecting conductors, said printed-circuit boards being isolated from one another by at least one electrically insulating formed-fabric-reinforced intermediate layer.

6. The flat seal according to claim 4, wherein at least one of the cover layers and the intermediate layer is comprised of an aramide-fiber formed fabric that is impregnated with a polymer mixture, and has a mass per unit area of 30 to 200 g/m$^2$.

7. The flat seal according to claim 4, wherein the printed-circuit boards are arranged on the opposite sides of a reinforcement layer.

8. The flat seal according to claim 1, wherein the reinforcement layer is a metal core.

9. The flat seal according to claim 7, wherein the reinforcement layer is a polymer core.

10. The flat seal according to claim 9, wherein the reinforcement layer is a rigid printed circuit board that has interconnect traces, and is laminated on both sides with cover layers of impregnated formed fabric.

11. A flat seal comprising:

a first cover layer providing a first polymer sealing surface;

a second polymer cover layer providing a second polymer sealing surface, each of said cover layers being formed of at least one formed-fabric-reinforced cover layer;

a series of electrical interconnect traces sealingly sandwiched between the first and second cover layers, so that the material of the cover layers completely surrounds the electrical interconnect traces, wherein the first cover layer, the second cover layer, and the interconnect traces collectively form a flexible printed circuit board;

a pair of metallic flanges having surfaces that the flat seal seals off, wherein the metallic flange surfaces border on the cover layers, the metallic flange surfaces forming the plates of a capacitor;

a metal electrode located between the cover layers; and connecting conductors that protrude via terminal pads out of the printed circuit board, wherein the cover layers have an electrical resistance of at least $10^8$ ohm and also serve to provide insulation for the interconnect traces.

12. The flat seal according to claim 11, wherein the metal electrode is surrounded on the peripheral side by an annular protective electrode.

13. The flat seal according to claim 12, wherein the interconnect traces function as the metal electrode.

14. The flat seal according claim 1, further comprising a piezoelectric sensor film having metal electrodes, wherein the connecting conductors are disposed to influence the metal electrodes of the piezoelectric sensor film so that electrical contact occurs when the seal is pressurized.

15. The flat seal according to claim 12, wherein at least one electrode functions to provide information regarding temperature as a function of the electrode resistance.

16. The flat seal according to claim 12, wherein at least one electrode functions to limit the capacitor field.

* * * * *